United States Patent [19]

Dunn, Jr. et al.

[11] 3,967,011

[45] June 29, 1976

[54] PROCESS FOR IMPREGNATING WOOD

[75] Inventors: James L. Dunn, Jr., Lake Jackson; Harold G. Liddell, Angleton, both of Tex.

[73] Assignee: The Dow Chemical Company, Midland, Mich.

[22] Filed: June 25, 1973

[21] Appl. No.: 372,875

Related U.S. Application Data

[63] Continuation-in-part of Ser. No. 728,755, May 13, 1968, abandoned.

[52] U.S. Cl. .................. 427/345; 427/377; 427/397; 427/440

[51] Int. Cl.[2] .................. C08J 7/08

[58] Field of Search .............. 117/147, 116, 57, 59, 117/149; 21/66, 7; 107/102 R, 102 A; 427/377, 397, 440, 345

[56] References Cited

UNITED STATES PATENTS

| | | | |
|---|---|---|---|
| 2,020,172 | 11/1935 | Cotchett | 117/59 |
| 2,650,885 | 9/1953 | Hudson | 117/147 |
| 2,652,347 | 9/1953 | Hudson | 117/59 |
| 2,860,070 | 11/1958 | McDonald | 117/59 |
| 3,200,003 | 8/1965 | Bescher | 117/59 |
| 3,597,257 | 8/1971 | Dunn | 117/57 |
| 3,685,959 | 8/1972 | Dunn et al. | 117/59 |

FOREIGN PATENTS OR APPLICATIONS

| | | | |
|---|---|---|---|
| 519,730 | 12/1955 | Canada | |
| 1,068,883 | 11/1959 | Germany | |
| 965,765 | 7/1949 | Germany | 427/393 |
| 140,639 | 6/1953 | Sweden | |

OTHER PUBLICATIONS

"Chemical Engineering Handbook", John H. Perry ed., 3rd Edition, 582, McGraw Hill, N.Y., 1950.

American Wood–Preservers, Assoc. "Drying Lumber by the Vapor Process", Monie S. Hudson, pp. 209–218.

Ind. and Eng. Chem., "Solvent Recovery from Pentachlorophenol–Treated Wood," vol. 45, No. 7, July, 1953, pp. 1576–1583.

*Primary Examiner*—Bernard D. Pianalto
*Attorney, Agent, or Firm*—Glwynn R. Baker

[57] ABSTRACT

An improved method of impregnating wood with a preservative is achieved by using halogenated solvents as carriers for the preservative or other wood treating chemicals and removing the carrier from the treated wood by treatment with steam. Benefits derived from this process include fewer steps, substantially complete removal of solvent, and the production of a natural appearing wood product having a surface suitable for painting.

6 Claims, No Drawings

PROCESS FOR IMPREGNATING WOOD

RELATED APPLICATION

The present application is a continuation-in-part of our previous application Ser. No. 728,755, filed May 13, 1968 and now abandoned.

BACKGROUND OF INVENTION

In the past, it has been customary to impregnate wood with preservatives such as pentachlorophenol by first steaming the wood, subjecting the wood to a vacuum or to air pressure, placing the so-pretreated wood in a solution of the preservative contained in a petroleum distillate solvent, soaking the wood for a period of time or forcing the solution into the wood under pressure and finally employing steam and vacuum to remove excess petroleum distillate solvent from the surface only, leaving the bulk of the oil in the wood. Such a process requires about 16 hours to complete and has proved to have several disadvantages. First, the solvents normally employed are flammable, thereby presenting a flammability hazard during the treating process. In order to avoid the flammability problem, it was necessary in the past to use a higher boiling hydrocarbon, e.g. a heavy oil. As a consequence it was more difficult to remove. The commonly employed petroleum distillate solvents likewise tend to bleed out of the wood with ageing thereby producing a toxic effect on animals and men coming in contact therewith. The phenomenon of bleeding likewise prevents paint and other coatings from properly adhering to wood. In addition, the hydrocarbon remaining in the wood oxidizes, forming colored products which darken the wood.

The prior art is replete with teachings of improved procedures for impregnating wood with various chemicals such as preservatives, fire retardants, dimensional stabilizers and the like. The more recent preservative processes have proclaimed results which, in addition to providing protection, render the wood clean, the carrier and preservative do not exude from the wood. The most widely used clean wood process is the so-called salt process, of CCA, which employs water containing soluble salts such as copper oxide, chromic oxide and arsenic acid. This process is losing its appeal due to the added expense of both clean-up of the excess treating solution to avoid environmental pollution and reseasoning (drying) after treatment. The other clean wood process in use today is known as the "Cellon" process and is based on patents issued to R. H. Bescher and assigned to Koppers Company, Incorporated, particularly Nos. 3,199,211 and 3,200,003. The (Cellon process employs a liquid petroleum gas (LPG) such as propane, butane, and isobutane, along with a high boiling cosolvent as the carrier or solubilizing agent for the preservative. Other petroleum hydrocarbons such as benzene, toluene, xylene, the heavy naphthas such as diesel oil, fuel oil, light bunker oil and the like have been suggested as carriers. The alcohols, such as methanol, have also been suggested as carriers. Hudson, in U.S. Pat. No. 2,650,885, and McDonald, in U.S. Pat. No. 2,860,070, each Disclose processes which employ chlorinated hydrocarbons such as trichloroethylene and perchloroethylene.

The technology of wood treating with preservatives can be said to begin with Rueping who discovered that reduced cost could be realized by subjecting the wood to air pressure prior to immersion in the treating solution. The air pressured into the wood is trapped by the impregnating solution and upon release of the pressure the excess solution is forced out of the wood, leaving only sufficient solution to coat the cells rather than fill them.

Such technique was the forerunner of the technique which has become known as the "empty cell" technique. The Reuping process is described in three U.S. Pats., namely U.S. Pat. No. 709,799 issued in 1902, Re. U.S. Pat. No. 12,707 issued in 1907 and U.S. Pat. No. 1,008,864 issued in 1911. Next appears a process which has become known as the "full cell" technique in which prior to impregnation the wood is subjected to a vacuum. This process is described in U.S. Pat. Nos. 2,135,029 and 2,135,030 issued to Böller and U.S. Pat. No. 2,314,362 issued to Mills.

The next innovation appears to be that of Monie S. Hudson described as a vapor drying technique. The Hudson patents, U.S. Pat. Nos. 2,435,219 and 2,650,885, employ the Rueping air pressurization, impregnation with a solvent carrier containing the treating agent followed by repeated contacting of the treated wood (after draining) with the vapors of a solvent to heat the wood together with intermittent periods of vacuum to vaporize the solvent more rapidly from the heated wood.

Following Hudson, McDonald in U.S. Pat. No. 2,860,070 disclosed a procedure wherein perchloroethylene, for example, containing the treating agent was employed following drying (seasoning in perchloroethylene, vapor-drying vacuum technique). The vapor-drying vacuum technique was thus employed specifically in the case of perchloroethylene.

Finally, Bescher in U.S. Pat. Nos. 3,199,211 and 3,200,003 disclosed the process which has come to be known as the Cellon process. The process uses the liquifiable petroleum gas (LPG) carrier and employs a purge with a non-condensable gas low in oxygen content to free the cylinder of air before and after impregnation to prevent the highly flammable vapors coming into contact with oxygen at proportions near or above their explosive limits.

Each of these prior art processes possesses one or more disadvantages. For example, as previously mentioned the Bescher Cellon process requires low oxygen content gas purge to prevent fire and explosion. Further, large quantities of the LPG are lost during the after treatment purge with gases such as nitrogen. In addition, the treated wood must be air seasoned for several weeks before use to permit the LPG remaining in the wood to equilibrate with the atmosphere. Also, upon being brought out of the cylinder, the wood is covered by needle crystals of pentachlorophenol on its surface which requires the wood to be cleaned free by brushing or alkaline washing prior to use.

The hydrocarbon treated woods, as in the Reuping and Hudson process, employing flammable solvents require careful handling to avoid the flammable or explosive limits of the particular solvent. The Hudson vapor-drying process and the Rueping process as well as the McDonald process each require vacuum systems to assist in the recovery of this solvent. In addition the Reuping process requires high pressure air for pre-impregnation and the Boller process requires a vacuum pretreatment prior to impregnation. The salt treatments are subject to different disadvantages, the primary one being the wood must be seasoned (dried)

both before and after treatment. Thus, while many techniques have been employed to impregnate wood each is rife with disadvantages which have limited their acceptance, in most instances, to special situations which can afford the risk or the expense.

It therefore is an object of the present invention to provide a process employing non-flammable solvents, which solvents are substantially completely removed following impregnation, which can be substantially recovered after removal from the wood, which do not migrate to the surface and bring wood rosins and preservative to the surface, and which permit the wood to be painted immediately after removal from the cylinder. In addition, it is an object of the present invention to provide a process which does not require low oxygen or oxygen free gas purges before and/or after impregnation or air pressure or vacuum cycles before or after impregnation. It is a still further object of the present invention to provide a process which by simple recovery techniques prevents both air and water pollution at the treating site.

Another object of this invention is to provide a process whereby the solvent for the wood preservative can be substantially completely removed from the wood.

A further object of the present invention is to provide a process whereby the wood preservative is not brought to the surface of the wood by the solvent bleeding.

A still further object is to provide a process which produces a light, natural colored product and one which can be painted.

These and other objects and advantages of the present process will become apparent from the reading of the following detailed description.

BRIEF DESCRIPTION OF INVENTION

It has now been discovered that the objects and advantages of the present process may be achieved by impregnating wood with a solution of the desired preservative in a liquid chlorinated solvent and subsequently steaming the treated wood to recover the chlorinated solvent therefrom. Wood treated in this manner contains little or no residual solvent and is therefore not subject to surface bleeding. The process likewise provides the additional advantage of producing a treated wood product which has no increased flammability, which retains its light color and natural appearance and which does not darken with age due to decomposition of the solvent contained therein.

In general, the wood treating process of the present invention is accomplished by placing wood in the desired physical form such as posts, poles, boards, and the like in a treating container or chamber. The container is then filled, without any pre-treatment such as vacuum or air pressure, with treating solution comprising a wood preservative, such as pentachlorophenol, in a chlorinated hydrocarbon solvent. Additionally, a minor amount of a polyether, such as a polypropylene glycol may be added to the solution to prevent "blooming", or surface crystallization, of the preservative upon weathering of the treated wood. If the wood is not likely to be subjected to weathering no additive is required because the preservative usually has a sufficiently high vapor pressure to remain in the wood not subject to weather. Pressure, when needed, is then applied within the container to force the preservative solution into the pores of the wood. When impregnation is complete, the remaining preservative solution is removed from the container and the wood is steamed to remove the carrier solvent retained in the wood to an extremely low level. The wood, which then has a clean, natural appearance is removed from the cylinder and is ready for use. It may be immediately painted without any air curing or other treatment.

Suitable wood preservatives for use in the process of this invention include pentachlorophenol, 2,3,4,6-tetrachlorophenol, 2,4,5-trichlorophenol, 2,4,6-trichlorophenol, 4-chloro-2chloropentylphenol, beta-naphthol, copper naphthenate and phenyl mercury oleate. Other known wood-preservative compounds which are soluble or can be suspended in the chlorinated hydrocarbon carriers in this invention may be used.

The amounts of preservative and the depth of penetration necessary to provide the desired protection are well known to those skilled in the art of wood preservation. In the case of pentachlorophenol and closely related compounds, a desirable level is from about 0.35 to 0.8 lbs. of preservative per cubic foot of wood on a dry weight basis. Further, the preservative should usually penetrate the wood to a depth of about 2½ inches or at least all the sap wood.

To achieve the advantages of the present invention, it is necessary to employ a halogenated hydrocarbon as a solvent for the preservation, e.g. a liquid chlorinated, fluorinated or brominated hydrocarbon containing at least two halogen atoms and 1 to 3 carbon atoms, such as carbon tetrachloride, methylene chloride, methyl chloroform, perchloroethylene, 1,1-dichloroethane, 1,2-dichloroethylene, ethylene dichloride, propylene dichloride, 1,1,2-trichloroethane, trichloroethylene, 1,2,3-trichloropropene, dibromodifluoroethane (BrFCHCHFBr), dichlorotetrafluoroethane ($ClF_2CCF_2Cl$), trichlorotrifluoroethane ($Cl_2FC{\cdot}CF_2Cl$), tetrafluorodibromoethane ($BrF_2C{\cdot}CF_2Br$), tetrachlorodifluoroethane ($Cl_2FC{\cdot}CFCl_2$), cis-trans dichloroethylene ClCH:CHCl), and trichloroethylene ($Cl_2C$:CHCl), and the like.

Further in the process of this invention, it is desirable that the liquid, halogenated hydrocarbon contain from about 2.0 to about 10 weight percent of pentachlorophenol with from about 4.5 to about 5.5 weight percent being preferred. In the case of other preservatives different concentration ranges may be necessary or desirable. Since the chlorinated hydrocarbons are among the heaviest of the desirable carriers, greater amounts of preservative can be introduced into the wood per cubic foot with lower volume carrier concentrations than the previous hydrocarbon and alcohol carriers.

If pentachlorophenol or other crystalline preservatives are employed, which tend to migrate to the surface of the wood on weathering or equilibration of carrier with the atmosphere and form a crystalline layer which is often referred to as "blooming", it is usually desirable to add to the preservative solution a polyether as an anti-blooming agent. Suitable polyethers include polypropylene glycols, having molecular weights from about 400 to about 4,000. Such anti-blooming agents are desirably employed in concentrations of up to about 5 weight percent. Concentrations above 5 weight percent may be employed but no additional advantage is achieved thereby.

The treating solution defined above is impregnated into the wood by soaking, or, if desired, by means of pressure up to about 150 psig. The time necessary to impregnate the wood is generally shorter when increased pressure is employed and the time for such impregnations usually ranges from about 30 minutes to several hours when using pressure whereas soaking may require 24 hours or more to achieve the same results. The time required to achieve any desirable degree of penetration is also dependent upon other factors such as porosity of the wood being treated. The amount of preservative taken up by the wood will be determined by the solution concentration and the porosity of the wood in addition to the time and pressure mentioned above. The use of additional time and pressure beyond that needed to achieve the desired amount of impregnation is more costly and may tend to increase the difficulty of solvent recovery.

No steaming of the wood prior to impregnation is required when the preservative solution of this invention is employed; neither is vacuum required during removal of the carrier. It also has been found that increased temperature does not increase the penetration or the ease of penetration of the preservative solution into the pores of the wood. Therefore, for convenience, it is desirable to operate at or near ambient temperatures, e.g. from about 5° to about 35°C.

Once the impregnation step has been completed, excess preservative solution is drained from the treating cylinder or other treating chamber, and the treated wood is contacted with steam which may be from a source outside the cylinder or generated within the cylinder. Steaming of the wood to remove the halogenated hydrocarbon solvent therefrom is conveniently conducted at atmospheric pressure with steam at 100°C or slightly above, but the temperature of the wood should never exceed above 140°C, the point at which structural strength is acknowledged to be affected. The time required to achieve adequate solvent recovery depends on the nature of the solvent employed and the particular wood being used. For example, methylene chloride may be adequately removed from a ponderosa pine log by contact with a flow of steam for about 10 hours. The vapors from the steaming step, which contain steam and halocarbon solvent, are condensed, the aqueous and organic liquid phases are separated from each other and the solvent phase is available for reuse in the impregnation step. The aqueous phase may be returned to the steam source. This technique of returning the condensate to the steaming step assists in the overall economy of solvent since no solvent is purged to the atmosphere. This also makes the process more desirable from the standpoint of environmental pollution.

The improved process of this invention finds particular utility in the preparation of wood for use in railroad cross-ties, utility pole cross-arms, fence posts, piles for both marine and land use, poles for the pole-type buildings, bridge, mine, cooling tower and other structural wood timbers and is particularly useful where it is desirable to retain the natural appearance of the wood, where the treated wood is to be painted or where, for any reason, solvent bleeding to the surface of the wood undesirable. The scope of this patent depicts preservation of wood but other modifications of the wood such as dimension stabilization, bulking and the like by this process are considered a part of this patent.

The following examples are provided to more fully illustrate the invention but are not to be construed as limiting to the scope thereof.

EXAMPLE 1

Four ponderosa pine wood posts 12 feet long and 7 inches in diameter were placed in a treating cylinder 13 feet long and 2 feet in diameter. The cylinder was filled with a solution containing 4.93 weight percent pentachlorophenol and 2.3 weight percent of a polypropylene glycol having an average molecular weight of 750 in a methylene chloride solvent. The cylinder was then sealed and additional preservative solution of the same composition was pumped into the cylinder to provide and maintain a constant pressure of 100 psig for one hour at a temperature of 20°C. During this period, the posts absorbed 150 lbs. of solution. At the end of the period, excess solution was pumped from the cylinder and the treated posts were contacted with a flow of steam at 100°C. for a period of about 10 hours to remove the chlorinated solvent therefrom. The products of the steaming step were condensed and the liquid phases separated. It was found that substantially all of the original methylene chloride solvent had been recovered by the steam stripping process. In the first 5–6 hours 90% of the solvent absorbed by the posts was recovered.

The impregnated posts were then removed from the cylinder and found to have retained their clear natural color which remained unchanged after 60 days weathering. The moisture content which was originally 17% was found to be unchanged.

EXAMPLE 2

In the manner of Example 1 the same kind, size and number of posts were treated with a solution of perchloroethylene containing 4.42 percent by weight of pentachlorophenol and 2.3 percent by weight of the polypropylene glycol used in Example 1. The treatment was carried out for 30 minutes at 15°C. at a pressure of 50 psig during which time 306 pounds of solution was absorbed by the logs. The residual solution was drained from the cylinder and the logs were steamed for 24 hours at 100°C. which accomplished recovery of 90% of the original solvent. The treated posts had retained their original natural color and continued to retain their natural color even after 60 days of exposure to the weather.

EXAMPLE 3

The process of Example 2 was repeated using a 4.60 percent by weight solution of pentachlorophenol in methyl chloroform which also contained 2.3% of the same poyglycol used in Examples 1 and 2. Pressure was maintained at 50 psig for 30 minutes at 19°C. and the logs were steamed at 100°C. for 20 hours. Ninety-five percent of the original solvent was recovered, ninety percent of it in the first 14 hours. These logs also were observed to have a natural color which was unchanged after 60 days weathering.

We claim:

1. A substantially non-polluting wood treating process for the impregnation of wood with preservatives to obtain substantially uncolored, natural appearing wood which consists of 1. contacting, in a pressure vessel, wood with a solution of a wood preservative dissolved or suspended in a liquid halogenated hydrocarbon solvent at a pressure of from atmospheric pressure up to about 150 psig for a period of time sufficient to incorporate an amount of preservative into the wood and penetrate preservative to a depth into the wood to provide the desired protection, said solvent being non-flammable by Tag Closed Cup; having a specific gravity greater than 1.1, a heat of vaporization less than 150 BTU/No. (78.6 cal/gm) and immiscible with water;

2. removing excess solution from contact with the impregnated wood and 3. heating the wood under ambient pressure by contacting said wood with a flow of steam for a time sufficient to substantially remove the chlorinated hydrocarbon solvent therefrom, said steam being at from its atmospheric boiling point to its boiling point at about 30 psig; withdrawing the vapors from the pressure vessel and 4. condensing the vapors;

5. separating the solvent from the water condensate;

6. recycling the condensate water to the steam treatment for generation of steam, recycling the solvent for reuse in preparing the solution of wood preservative for the impregnation step.

2. A process according to claim 1 wherein the wood preservative solution additionally contains up to about 5 weight percent of a polyether as an antiblooming agent.

3. The process of claim 2 wherein the polyether is a polypropylene glycol having an average molecular weight of between about 400 and 4000.

4. The process of claim 1 wherein the preservative concentration in the solvent is from about 4.5 to about 5.5 weight percent and the solvent is methylene chloride.

5. The process of claim 1 wherein the preservative is pentachlorophenol.

6. The process of claim 1 wherein the pressure is from about 40 to about 150 psig.

* * * * *

UNITED STATES PATENT AND TRADEMARK OFFICE
CERTIFICATE OF CORRECTION

PATENT NO. : 3,967,011

DATED : June 29, 1976

INVENTOR(S) : James L. Dunn, Jr., et al.

It is certified that error appears in the above-identified patent and that said Letters Patent are hereby corrected as shown below:

Col. 1, line 44, delete "of" and insert -- or --.

Col. 1, line 53, delete " (Cellon " and insert -- "Cellon" --.

Col. 1, line 63, delete "Disclose" and insert -- disclose --.

Col. 2, line 9, delete "Reuping" and insert -- Rueping --.

Col. 2, line 37, insert quotation marks (") around "Cellon".

Col. 2, line 46, insert quotation marks (") around "Cellon".

Col. 2, line 57, delete "Reuping" and insert -- Rueping --.

Col. 2, line 58, delete "process" and insert -- processes --.

Col. 4, line 9, delete "2chloropentylphenol" and insert -- 2-chloropentylphenol --

Col. 5, line 61, after the word "wood" insert -- is --.

Col. 6, line 51, delete "poyglycol" and insert -- polyglycol --.

Col. 7, line 5, delete "No." and insert -- # --.

Signed and Sealed this

Twenty-sixth Day of October 1976

[SEAL]

*Attest:*

RUTH C. MASON
*Attesting Officer*

C. MARSHALL DANN
*Commissioner of Patents and Trademarks*